United States Patent [19]
Snyder

[11] Patent Number: 5,886,622
[45] Date of Patent: *Mar. 23, 1999

[54] ALARM SYSTEM WITH SENSOR SIGNAL EVALUATOR

[75] Inventor: Douglas D. Snyder, Bergholz, Ohio

[73] Assignee: Jon Snyder, Inc., Wintersville, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 265,404

[22] Filed: Jun. 24, 1994

[51] Int. Cl.⁶ ..................................................... G08B 13/02
[52] U.S. Cl. .......................... 340/426; 340/429; 340/565; 340/566; 180/287; 307/10.2
[58] Field of Search ..................................... 340/426, 429, 340/565, 566; 307/10.2; 180/287

[56] References Cited

U.S. PATENT DOCUMENTS

| | | | |
|---|---|---|---|
| 4,359,717 | 11/1982 | Huber et al. ............................. | 340/429 |
| 4,383,242 | 5/1983 | Sassover et al. . | |
| 4,437,089 | 3/1984 | Achard .................................... | 340/522 |
| 4,584,569 | 4/1986 | Lopez et al. ............................. | 340/566 |
| 4,633,234 | 12/1986 | Gagnon .................................... | 340/566 |
| 4,740,775 | 4/1988 | Price ...................................... | 340/426 |
| 4,772,875 | 9/1988 | Maddox et al. . | |
| 4,794,368 | 12/1988 | Grossheim et al. ...................... | 340/426 |
| 4,845,464 | 7/1989 | Drori et al. .............................. | 340/429 |
| 4,856,072 | 8/1989 | Schneider et al. . | |
| 4,864,288 | 9/1989 | Cross . | |
| 4,866,417 | 9/1989 | DeFino et al. ........................... | 340/429 |
| 4,885,572 | 12/1989 | Iwata et al. ........................... | 340/425.5 |
| 4,897,630 | 1/1990 | Nykerk .................................... | 340/426 |
| 4,987,402 | 1/1991 | Nykerk .................................... | 340/426 |
| 5,051,723 | 9/1991 | Long et al. .............................. | 340/566 |
| 5,084,697 | 1/1992 | Hwang .................................... | 340/566 |
| 5,117,217 | 5/1992 | Nykerk .................................... | 340/426 |
| 5,181,010 | 1/1993 | Chick ...................................... | 340/426 |
| 5,185,593 | 2/1993 | DuRand, III et al. . | |
| 5,193,141 | 3/1993 | Zwern . | |
| 5,245,694 | 9/1993 | Zwern . | |
| 5,315,285 | 5/1994 | Nykerk . | |
| 5,459,947 | 10/1995 | Snyder et al. . | |
| 5,532,670 | 7/1996 | Issa et al. ................................ | 340/429 |
| 5,612,670 | 3/1997 | Snyder et al. ........................... | 340/429 |

OTHER PUBLICATIONS

Bulldog Security, Inc., "Specification Sheet".

*Primary Examiner*—Edward Lefkowitz
*Attorney, Agent, or Firm*—Wood,Herron&Evans, L.L.P.

[57] ABSTRACT

An alarm system having a signal evaluator is disclosed. The system includes an alarm controller and at least one sensor that generates a signal that corresponds to the magnitude of a detected event. The signal evaluator is part of the controller and receives the magnitude signal from the sensor. The signal evaluator compares the magnitude signal to an alarm threshold and generates an alarm signal if the magnitude signal exceeds the alarm threshold. If not, the signal evaluator compares the magnitude signal to a warning threshold and generates a warning signal if the magnitude signal exceeds the warning threshold and is less than the alarm threshold. The signal generated by the signal evaluator is coupled to an alarm annunciator which generates an alarm in response to the alarm signal and a warning in response to the warning signal. The warning and alarm may be vocal, a siren, or a chirp.

13 Claims, 1 Drawing Sheet

ALARM SYSTEM WITH SENSOR SIGNAL EVALUATOR

FIELD OF THE INVENTION

This invention relates to alarm systems generally and, more particularly, to vehicle alarm systems.

BACKGROUND OF THE INVENTION

Alarm systems for installation in movable vehicles such as automobiles are well known. These systems typically include an alarm controller that is coupled to an alarm annunciator and sensors located throughout the vehicle for detecting specific events indicative of a security violation. The alarm controller typically includes a microprocessor or microcontroller with sufficient memory and input/output (I/O) interface devices to effectively couple the controller to the sensors. The system is typically powered from the battery source from the vehicle. Sometimes a back-up battery is included for the alarm controller so the controller remains powered in the event an intruder cuts the battery cable.

A variety of sensors are used in such alarm systems. These sensors include current sensors that are coupled to the interior lights of the vehicle to detect the current flow for operating a light when a door is opened; a motion detector to detect movement in a radiated field about the vehicle; and a shock sensor to detect impact to the vehicle usually indicative of an unauthorized entry event or vandalism. The signals from the sensors are presented to the alarm controller and the alarm controller typically evaluates whether the sensor signal requires an alarm, or no response for the alarm annunciator.

One problem with these previously known systems is the difficulty in evaluating the severity of the violation event. The vehicles are often parked in areas, such as parking garages, shopping mall parking lots, and the like, where there is significant pedestrian traffic and/or incidental bumping of the vehicle. This non-destructive contact with the vehicle or radiated field about the vehicle is difficult to distinguish from violation events. An alarm system that can distinguish between incidental bumping or casual traffic and the presence of an intruder generates fewer false alarms. False alarms are undesirable because they drain the vehicle battery, and, if too frequent, may be ignored by security personnel.

Previously known systems have incorporated a scheme of counting the number of events detected by a sensor to determine whether the sensor is detecting an intrusion or vandal event. In response to a count below a predetermined alarm number, the system generates a warning while an alarm is generated for count values exceeding the alarm number. One problem with this counting scheme is that in an area of high traffic or significant shock, such as the vibrations created by traffic in a multi-floor concrete garage, enough events still occur to exceed the alarm number and generate a false alarm. Thus, the counting scheme does not substantially reduce the chance of false alarms in all areas.

Another attempt to provide an alarm system with the ability to evaluate the severity of a sensor event is to provide a single threshold value for comparing the magnitude of a sensor signal to a predetermined threshold. If the magnitude of the signal from the sensor exceeds the threshold, an alarm is sounded, otherwise, no response is generated. One problem with the single threshold scheme is the inability of the alarm system to warn a tentative intruder that the vehicle is equipped with an alarm system. For example, an intruder may tap some portion of the car to see if an alarm is actuated and gaining a false sense of security when no alarm sounds, increase the impact of the blow to gain access to the car. While the intruder may flee in response to the alarm generation when the sensed blow magnitude exceeds the single threshold, significant damage may be done to the vehicle.

In an effort to remedy the single threshold problem, alarm systems have been developed that permit a user to adjust the threshold level for different situations. This is typically done by putting the alarm system in a test mode and then striking the vehicle with a force that is used by the alarm controller as the single threshold. While this gives the user some control over the sensitivity of the threshold setting, it does not provide both a warning and an alarm. What is need is an alarm system that provides both a warning and an alarm without the drawbacks of the known counting scheme.

SUMMARY OF THE INVENTION

In accordance with the principles of the present invention, an alarm system is provided with a sensor for detecting an event and generating a magnitude signal corresponding to a magnitude of a detected event, and a signal evaluator operatively coupled to the sensor, the signal evaluator generating an alarm signal in response to the magnitude signal exceeding a first predetermined alarm threshold and the signal evaluator generating a warning signal in response to the magnitude signal being less than the first alarm threshold and exceeding a second warning threshold. Thus, the inventive alarm system evaluates a signal from a single sensor to determine whether a warning, an alarm, or no response should be generated.

In a preferred embodiment of the present invention, an alarm system includes an alarm controller that incorporates the signal evaluator in software. The magnitude signal from the sensor is provided to the alarm controller in digital form and the software programmed in accordance with the principles of the present invention compares the digital signal value to an alarm threshold. If the digital signal value is greater than the alarm threshold, an alarm is generated. If the digital signal value is less than the alarm threshold, the digital signal value is compared to a warning threshold. If the digital signal value exceeds the warning threshold, a warning is sounded. If the digital signal value does not exceed the warning threshold, no response is generated. Preferably, the warning threshold is twenty-five (25%) of the full scale magnitude of the sensor signal and the alarm threshold is seventy-five percent (75%) of the full scale signal magnitude.

Alternatively, the signal evaluator could receive an analog signal from the sensor indicative of the sensed event. The signal evaluator may compare the peak of the analog wave form to an alarm threshold and a warning threshold to evaluate the type of response the system should generate. Additionally, the signal evaluator could also determine the length of time that the signal exceeds one of the thresholds before determining the type of the response to generate.

An object of the present invention is to provide an alarm system that generates both a warning and an alarm without requiring multiple events before an alarm or warning is sounded. An advantage of the present system is that alarm controllers that utilize software to control the operation of the alarm system may be modified to incorporate the dual threshold approach of the present invention without altering the hardware of the system. These and other objects and advantages of the present invention will become apparent from the drawings and the detailed description of the invention provided below.

DETAILED DESCRIPTION OF THE INVENTION

Figure 1:
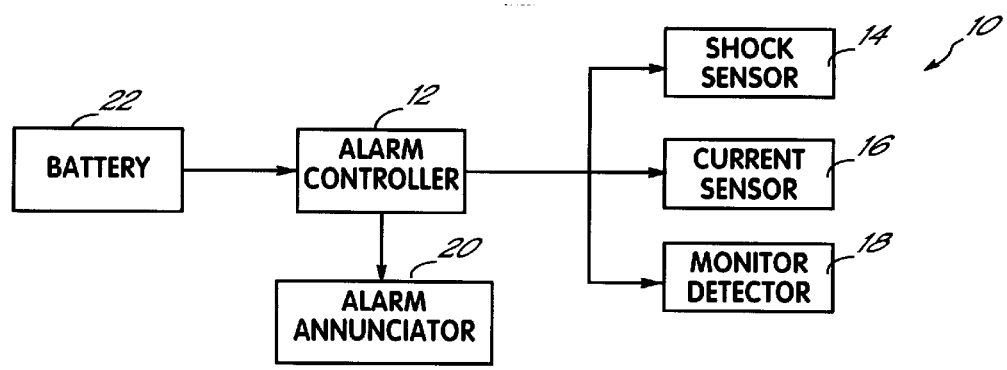
FIG. 1 is a block diagram of an alarm system incorporating the sensor signal evaluator of the present invention.

A block diagram of an alarm system 10 incorporating the present invention is shown in FIG. 1. That system 10 includes an alarm controller 12 that is coupled to a shock sensor 14, a current sensor 16, and a motion detector 18. The controller 12 is also coupled to an alarm annunciator 20 which emits an alarm or warning in response to an alarm or warning signal from controller 12. The alarm emitted by annunciator 20 may be a siren or a loud vocal alarm. The warning generated by the annunciator 20 may be a chirp or a warning message that states the vehicle is alarm protected and the intruder must step away.

The sensors in FIG. 1 are installed in the vehicle at the locations most appropriate for detecting violation events. For example, current sensor 16 is located within the electrical system of the car to detect a current flowing to an interior or dome light in response to a vehicle door being opened. There may be one or more motion detectors 18 located about the car to radiate a continuous 360° field about the car and detect motion within the radiated field. Likewise, one or more shock sensors 14 may be located about the vehicle where impact to gain access to the car is anticipated.

Alarm controller 12 is powered from the vehicle battery 22, but may also include a back-up battery in the event that vehicle power is lost. This is typically done to avoid alarm neutralization by cutting the battery cable or the like. In the preferred embodiment of the present invention, the alarm controller 12 includes a C71P microcontroller manufactured by MICROCHIP of Chandler, Arizona and is operated with a clock frequency of 500–750 KHz. This microcontroller includes a processor, I/O interfaces, and memory, both volatile and non-volatile, for the operation of the controller. The program which controls the operation of the alarm controller 12 is contained within the non-volatile memory of the controller.

The sensors coupled to controller 12 generate signals that indicate an event is occurring. Some of the sensors generate binary signals that indicate whether an event is occurring or not. For example, current sensor 16 may generate a logic high signal in response to current detection and generate a logic low signal when no current is sensed. Other sensors generate a signal that corresponds to the magnitude of a sensed event. For example, shock sensor 14 may generate an analog signal that corresponds to the magnitude of a sensed blow. Preferably, shock sensor 14 is a piezo filmstrip manufactured by Amp of Harrisburg, Pa. which produces a digital pulse train in response to an impact event. The number of pulses generated within a predetermined time interval corresponds to the magnitude of the sensed impact. Alternatively, the shock sensor 16 or the controller 12 may include an A/D converter that converts an analog magnitude signal to a digital value that may be read by controller 12 in a parallel manner. In like manner, motion detector 18 may generate a binary signal indicative of the presence or absence of a body within a radiated field or it may generate a signal indicative of the proximity of the body to the vehicle. As long as the signal generated by any sensor corresponds to a magnitude associated with the sensed event, evaluation of the signal may be performed in accordance with the principles of the present invention.

Within the memory of controller 12 is a signal evaluator program module. This module evaluates the signals received from the various sensors to determine whether controller 12 generates one of an alarm, warning, or no response signal for alarm annunciator 20. For each of the sensors that generate a magnitude signal, the evaluator compares the magnitude signal to an alarm threshold and, if needed, a warning threshold to determine the type of signal to be sent to the alarm annunciator 20.

Figure 2:
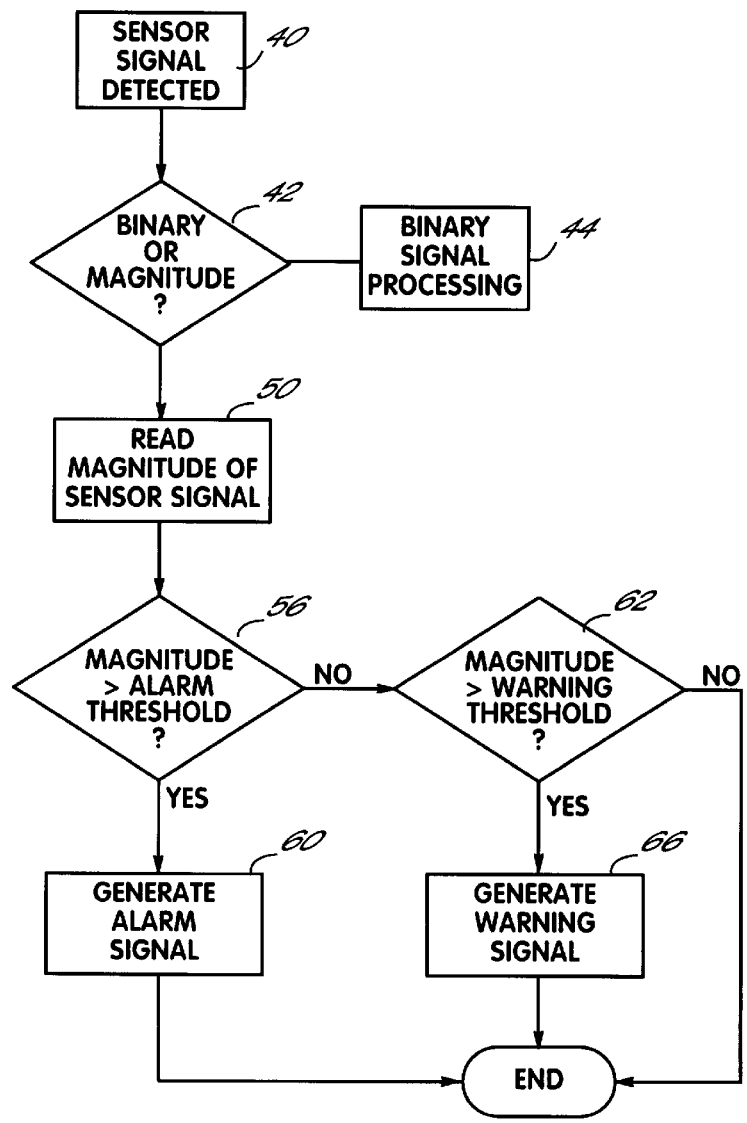
FIG. 2 is a flowchart of the processing performed by the signal evaluator of the present invention.

The flow chart, shown in FIG. 2, depicts the representative processing performed by the signal evaluator. The signal evaluator initiates execution whenever a sensor signal from one of the sensors is detected (Block 40). This detection may be generated by an interrupt signal generated by a sensor or by a I/O peripheral device used to interface sensor signals to the controller 12. Preferably, each sensor has an input line to controller 12 which controller 12 periodically polls to determine whether an event has been sensed. After detecting the signal, the evaluator determines whether the sensor signal is a binary or magnitude signal (Block 42) and reads the magnitude of the sensor signal (Block 50) if the sensor generates a magnitude signal. Otherwise, the evaluator performs the processing for a binary event signal (Block 44).

The signal evaluator compares the value of the magnitude signal to an alarm threshold (Block 56) and generates an alarm signal if the magnitude exceeds the alarm threshold (Block 60). Otherwise, the magnitude is compared to a warning threshold (Block 62) and if the magnitude exceeds the warning threshold, a warning signal is generated (Block 66). Otherwise, the detected signal magnitude does not warrant a response and the signal evaluator module execution terminates. It will thus be appreciated that there is no limit to the number of warning signals that may be generated in response to repeated sensed events without an alarm signal ever being generated, so long as the alarm threshold is not exceeded. This is a significant improvement over prior systems that use a counting scheme to establish a warning and an alarm threshold for multiple sensed events.

In the preferred embodiment, the alarm threshold is approximately equal to seventy-five percent (75%) of the full scale magnitude signal that could be received from a sensor detecting an event. The warning threshold is preferably twenty-five percent (25%) of the full scale magnitude signal, although other values for the alarm and warning thresholds may be used without departing from the principles of the present invention. The controller 12 preferably includes the capability of allowing the user to alter the alarm threshold. After the user puts the system in an adjustment or test mode to set the alarm threshold, the controller 12 determines a warning threshold from the user set alarm threshold. Controller 12 preferably determines the warning threshold by executing software that calculates the warning threshold as a proportion of the user set alarm threshold, although the adjustment may be done in hardware or the like. Additionally, the comparison of the magnitude signal to one of the two thresholds may further include a requirement that the threshold be exceeded for a predetermined period of time before a signal is sent to the alarm annunciator.

From the foregoing, it should be apparent that the present invention may be practiced with any controller that receives a sensor signal that corresponds to the magnitude of a detected event, as long as the magnitude of the detected event has a range in which a warning level and an alarm level threshold may be established. Although the signal evaluation of the preferred embodiment is implemented in software, it may be implemented in hardware as well. Such hardware would include interface circuitry for the sensor signal and a comparator for comparing the magnitude of the sensor signal to two or more predetermined thresholds. The reader should further appreciate that the invention may be practiced with more than two thresholds if further distinguishing alarms and warnings are possible with an alarm annunciator.

While the present invention has been illustrated by the description of a preferred and alternative embodiments, and while the embodiments have been described in considerable detail, it is not the intention of the applicant to restrict or in anyway limit the scope of the appended claims to such detail. Additional advantages and modifications will readily appear to those skilled in the art. For example, the alarm and warning thresholds may be made user adjustable by known methods to alter the conditions for generating one of the possible responses for the alarm system. The invention in its broadest aspects is therefore not limited to the specific details, representative apparatus and method and illustrative examples shown and described. Accordingly, departures may be made from such details without departing from the spirit or scope of applicant's general inventive concept.

What is claimed:

1. An alarm system comprising:
   a sensor for detecting an event, said sensor generating a magnitude signal corresponding to a magnitude of a detected event; and
   a signal evaluator operatively coupled to said sensor, said signal evaluator generating a sensor-initiated alarm signal only in response to said magnitude signal exceeding an alarm threshold regardless of whether said magnitude signal has exceeded said alarm threshold at other times, and said signal evaluator generating only a warning signal in response to said magnitude signal exceeding a warning threshold but not exceeding said alarm threshold regardless of whether said magnitude signal has exceeded said warning threshold at other times.

2. The system of claim 1, said sensor being a shock sensor that generates said magnitude signal corresponding to a sensed impact.

3. The system of claim 1, said sensor being a motion detector that generates said magnitude signal corresponding to a proximity of a body within a field radiated by said motion detector.

4. The system of claim 1, said alarm threshold being approximately 75% of a full scale value of said magnitude signal generated by said sensor.

5. The system of claim 1, said warning threshold being approximately 25% of a full scale value of said magnitude signal generated by said sensor.

6. The system of claim 2, said magnitude signal generated by said shock sensor being a pulse train that corresponds to said sensed impact.

7. The system of claim 6, said warning threshold being a predetermined pulse count number that is less than said alarm threshold.

8. The system of claim 1 further comprising:
   an alarm annunciator coupled to said signal evaluator, said alarm annunciator generating an alarm in response to said alarm signal and a warning in response to said warning signal.

9. The system of claim 8, said generated alarm being one of a vocal alarm and a siren.

10. The system of claim 8, said generated warning being one of a vocal warning and a chirp.

11. The system of claim 1 further comprising:
    a warning threshold adjuster that sets a warning threshold as a proportion of a user set alarm threshold.

12. A method for evaluating a magnitude signal generated by a sensor comprising:
    receiving said magnitude signal from the sensor;
    comparing said magnitude signal to an alarm threshold;
    generating a sensor-initiated alarm signal only if said comparison step indicates said magnitude signal exceeds said alarm threshold regardless of whether said magnitude signal has exceeded said alarm threshold at other times;
    comparing said magnitude signal to a warning threshold; and
    generating only a warning signal if said magnitude signal exceeds said warning threshold but not said alarm threshold regardless of whether said magnitude signal has exceeded said warning threshold at other times.

13. The method of claim 12 further comprising the step of:
    determining the alarm threshold to be approximately 75% of a full scale value of said magnitude signal; and
    determining the warning threshold to be approximately 25% of the full scale value of said magnitude signal.

* * * * *